(12) United States Patent
Bodurtha et al.

(10) Patent No.: US 7,433,839 B2
(45) Date of Patent: Oct. 7, 2008

(54) TOTAL RETURN ASSET CONTRACTS AND ASSOCIATED PROCESSING SYSTEMS

(76) Inventors: Stephen G. Bodurtha, 52 Starin Dr., Stamford, CT (US) 06902; Satyanarayan Chada, 400 Chambers, #10U, New York, NY (US) 10280; Mitchell M. Cox, 1 Dey Ct., Towaco, NJ (US) 07082; Thomas W. Lee, 17 Glen La., Levittown, NY (US) 11756

( * ) Notice: Subject to any disclaimer, the term of this patent is extended or adjusted under 35 U.S.C. 154(b) by 1359 days.

(21) Appl. No.: 10/103,170

(22) Filed: Mar. 20, 2002

(65) Prior Publication Data

US 2003/0182219 A1    Sep. 25, 2003

(51) Int. Cl.
    *G06Q 40/00*    (2006.01)
(52) U.S. Cl. .................................... 705/36 R
(58) Field of Classification Search ............ 705/36, 705/36 R
    See application file for complete search history.

(56) References Cited

U.S. PATENT DOCUMENTS

| | | | | |
|---|---|---|---|---|
| 4,677,552 A * | 6/1987 | Sibley, Jr. | ..................... | 705/37 |
| 4,994,964 A * | 2/1991 | Wolfberg et al. | .......... | 705/36 R |
| 5,210,687 A * | 5/1993 | Wolfberg et al. | .......... | 705/36 R |
| 5,285,383 A * | 2/1994 | Lindsey et al. | ............... | 705/26 |
| 5,692,233 A * | 11/1997 | Garman | .................... | 705/36 R |
| 5,806,048 A * | 9/1998 | Kiron et al. | ............... | 705/36 R |
| 5,873,071 A * | 2/1999 | Ferstenberg et al. | ...... | 705/36 R |
| 5,875,330 A * | 2/1999 | Goti | ........................... | 717/104 |
| 5,987,435 A * | 11/1999 | Weiss et al. | ............... | 705/36 R |
| 6,016,483 A * | 1/2000 | Rickard et al. | ............ | 705/36 R |
| 6,148,293 A * | 11/2000 | King | ............................ | 705/35 |
| 6,188,993 B1 * | 2/2001 | Eng et al. | ...................... | 705/37 |
| 6,317,728 B1 * | 11/2001 | Kane | ......................... | 705/36 R |
| 6,321,212 B1 * | 11/2001 | Lange | ...................... | 705/36 R |
| 6,513,019 B2 * | 1/2003 | Lewis | .......................... | 705/35 |
| 6,684,189 B1 * | 1/2004 | Ryan et al. | ..................... | 705/4 |
| 6,912,510 B1 * | 6/2005 | Shepherd | ..................... | 705/37 |
| 6,938,009 B1 * | 8/2005 | Herbst et al. | ............... | 705/36 R |
| 7,089,202 B1 * | 8/2006 | McNamar et al. | ............ | 705/35 |
| 2001/0025266 A1 * | 9/2001 | Gastineau et al. | ............ | 705/36 |
| 2001/0032161 A1 * | 10/2001 | Thomas et al. | ................ | 705/36 |
| 2001/0034688 A1 * | 10/2001 | Annunziata | .................. | 705/37 |
| 2001/0049649 A1 * | 12/2001 | Baecker et al. | ................ | 705/37 |
| 2001/0049651 A1 * | 12/2001 | Selleck | ......................... | 705/37 |
| 2001/0051912 A1 * | 12/2001 | Tanaka et al. | ................. | 705/37 |
| 2002/0002530 A1 * | 1/2002 | May | ............................. | 705/37 |
| 2002/0026399 A1 * | 2/2002 | Narayan et al. | ............... | 705/37 |

(Continued)

OTHER PUBLICATIONS

New York Times Company, N.Y. Times, Feb. 14, 1982, at A. 13.*

(Continued)

*Primary Examiner*—Mary Cheung
*Assistant Examiner*—Daniel L Greene
(74) *Attorney, Agent, or Firm*—Morgan, Lewis & Bockius LLP; Steven D. Underwood, Esq.

(57) ABSTRACT

A novel vehicle investment that greatly simplifies ownership and implementation of futures so that the pricing, trading, and risk management characteristics of futures investment are more broadly accessible by investors. Trading and account processing is implemented on a data processing platform that facilitates expanded access and use of risk management via futures contracts.

20 Claims, 5 Drawing Sheets

U.S. PATENT DOCUMENTS

| | | | |
|---|---|---|---|
| 2002/0026409 A1* | 2/2002 | Nozaki | 705/37 |
| 2002/0029194 A1* | 3/2002 | Lewis et al. | 705/39 |
| 2002/0046154 A1* | 4/2002 | Pritchard | 705/37 |
| 2002/0065752 A1* | 5/2002 | Lewis | 705/35 |
| 2002/0069155 A1* | 6/2002 | Nafeh et al. | 705/37 |
| 2002/0103744 A1* | 8/2002 | Llewelyn | 705/37 |
| 2002/0123954 A1* | 9/2002 | Hito | 705/36 |
| 2002/0128941 A1* | 9/2002 | Champion et al. | 705/36 |
| 2002/0178102 A1* | 11/2002 | Scheinberg et al. | 705/37 |
| 2003/0101125 A1* | 5/2003 | McGill et al. | 705/37 |
| 2003/0236727 A1* | 12/2003 | Champion et al. | 705/35 |

OTHER PUBLICATIONS

Richard E. Waldron, Futures 101: An Introduction to Commodity Trading, p. 44-45, 79-82, 94-101 (3rd Edition 1999 by Squantum Publishing Co.).*

CME and Merrill Lynch Launch PIMCO TRAKRS:Jun. 29, 2006: PR Newswire available @ http://www.advfn.com/news_CME-and-Merrill-Lynch-Launch-PIMCO-TRAKRS__15962364.html, last accessed Apr. 13, 2008.*

Back to the Futures, with lesS risk: Businessweek; Nov. 3, 2003; available @ http://www.businessweek.com/print/magazine/content/03_44/b3856121.htm?chan=mz, last accessed Apr. 13, 2008.*

* cited by examiner

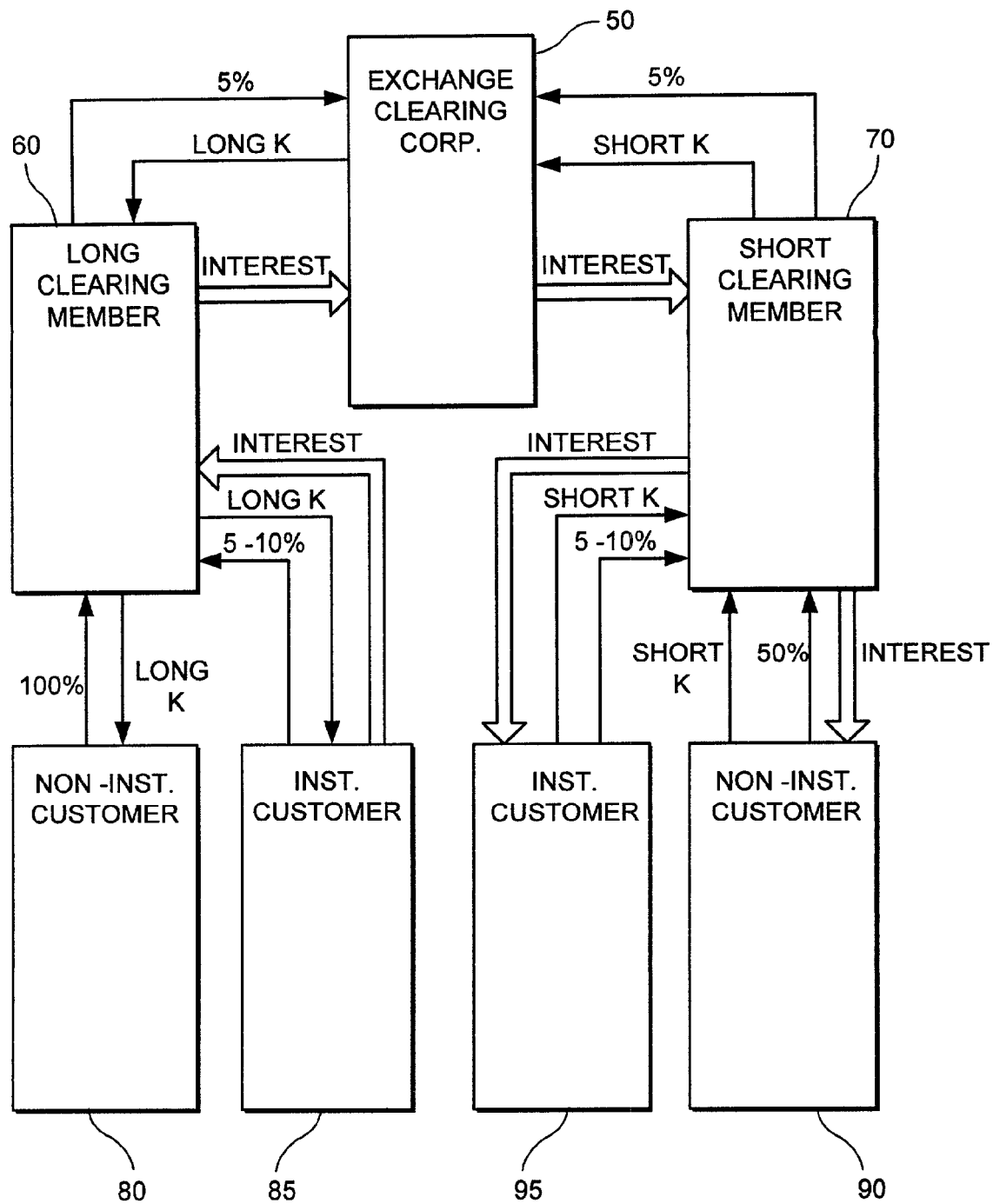
F I G. 1

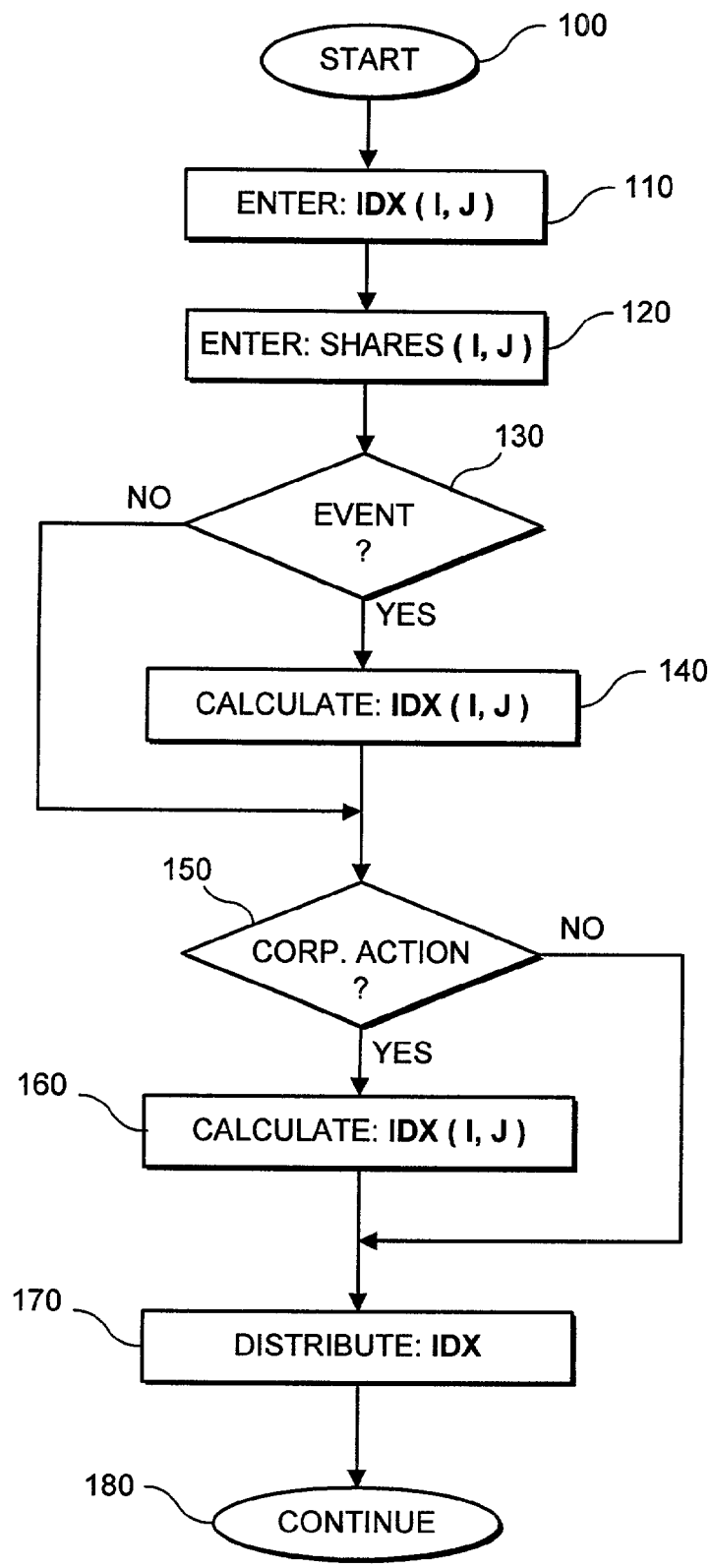
F I G. 2

TOTAL RETURN ASSET CONTRACTS AND ASSOCIATED PROCESSING SYSTEMS

FIELD OF THE INVENTION

The present invention generally relates to non-traditional futures contracts and associated computer systems for managing these contracts. More particularly, the present invention relates to selectively structured futures contracts having a pre-determined profile of trading properties and the data processing systems utilized to track and process investments therein.

BACKGROUND OF THE INVENTION

A broad spectrum of investment vehicles exists today allowing investors to take positions having a corresponding broad potential return and exposure to loss. For many years, professional investors have enjoyed the use of derivative investment vehicles to hedge or off-set positions and control risk. Risk management is a key desire among investors, and a corresponding growth in the use of futures contracts is reflective of their increasing role as risk management tools.

Futures contracts have a long history as risk management vehicles. Initially used in the agricultural field, farmers would employ futures contracts on their products to lock in a profitable price for their products. This was in effect a "hedge" against the risk of crop price drop and a loss suffered by the farmer due to the lower price commanded by the crops in the marketplace. The futures contract was an agreement by the farmer to deliver the crop at some future date, at a select (profit bearing) price. This contract was entered with a market speculator, gambling that the crop price would rise above the contract price on the delivery date. In the agricultural setting, speculators would often be joined by grain processors (e.g., cereal manufacturers) on the buy side of the contract, to lock in the price of a raw material (grain) for their products—again for risk management, but on the cost side.

As these contracts grew in popularity, markets quickly appeared and became proficient in trading the actual contracts as a separate asset class. These futures markets became highly liquid, offering investors quick access to risk management tools in a number of raw materials and commodities, including sugar, precious metals, soybeans, oil, and the like. As the traders gained experience with these tangible asset classes, the markets expanded into financial assets, such as government bonds, currencies, stocks and of particular concern here, stock indexes, such as the S&P 500.

Stocks and in particular stock indexes added a new complexity to the futures contract. As seen above, the futures contract was principally concerned with gaining access to a specified material at a pre-determined price. Accordingly, these early contracts, when due, resulted in the delivery of the underlying commodity—such as wheat—at the contract price. For a contract on an index, to deliver the underlying shares in the index would be unnecessary in view of the ready supply of the corresponding shares on other markets. The seller would instead, per the contract terms, deliver the difference between the contract price and market price for index stocks at the contract date, known as a cash settlement. In this way, the index futures contract becomes completely decoupled from the transaction costs associated with the underlying assets (here stocks).

An index futures contract is therefore a transaction that exchanges cash for the future value of the corresponding index. Much like other futures contracts, a highly liquid market has developed for trading the futures contracts on indexes.

A particularly useful example of this involves the S&P 500 Index as originated and published by Standard and Poor's, Inc. It is an index of the 500 largest companies based on market capitalization and is a well respected barometer of the general United States equity markets. In this market, S&P 500 futures contracts are offered with corresponding bid-ask price spreads, and traders buy and sell these contracts, going long or short in the general equity market.

Futures contracts are traded on regulated exchanges, such as the Chicago Mercantile Exchange ("CME"). The purchase and/or sale of futures contracts are made with licensed and trained brokers facilitated through the use of clearing agents. Typically, futures contracts are bought on margin, of approximately 5-10% of the index contract price. Because settlement involves the (phantom) delivery of the underlying shares at some future date, the contract price is greater than the index. This reflects the difference between the cost of holding the underlying stock (cost of finds, but return of dividends) and the contract (no funds, but no dividends). As the settlement date approaches, this differential narrows, and disappears on the settlement date.

As time progresses towards the settlement date, the stock prices go up and/or down and the index fluctuates in concert with corresponding impact on the contract holders. If, for example, the index drops, the long position may be required to provide more cash so as to maintain the margin for the account (known as "maintenance margin"). Also, this "marked to market" pricing has tax implications and is considered a taxable event at year end.

Index futures contracts have become very popular with large institutional investors, such as pension funds, insurance companies, banks, and the like. Index futures contracts are particularly valuable for hedging against, or speculating on, large general price movements in the equity market. Because simple diversification does not protect a portfolio from an across the board drop in equity prices, these institutional investors look to the index futures markets for help. Portfolio managers hedge against a drop by selling index futures contracts for the period in concern. If the market drops, the value of the index futures contracts—depending on the amount sold—will buffer the impact on the portfolio, protecting its value from the downside market swing. As most fund managers are long term holders of equity, the index futures contracts become an incredibly efficient hedge against a loss in "inventory" value.

While perhaps the most efficient and versatile investment available, the use of futures contracts is primarily limited to institutional investors for a number of reasons. For example, the market has developed into a field particularly structured for large institutions as the contract sizes are relatively large (e.g., the minimum contract size of an S&P 500 futures relates to approximately $350,000.00), purchases are highly regulated with margin limits and the pricing of these instruments, involving the corresponding assessment of interest rates and dividend yields, is complex. Indeed, even the tax consequences are designed with the institutional investor in mind. These factors have prevented small investors from any meaningful participation in the index futures markets and has thus deprived this growing investor class from the efficiencies and risk management benefits attendant with index futures contracts. It was with this understanding of the current market conditions that led to the present invention.

OBJECTS AND SUMMARY OF THE PRESENT INVENTION

It is, therefore, an object of the present invention to provide a computer system for managing a plurality of accounts that include one or more investments in a unique index based futures contract.

It is yet another object of the present invention to provide a data processing system for implementing a unique index based futures contract that is selectively configured for use by non-institutional customers and institutional customers.

It is still another object of the present invention to provide a novel form of futures contract that provides a future exchange date for valuation tied to a plurality of select assets while having few encumbrances so as to allow simplified ownership and transactions.

It is another object of the present invention to provide a computer system for managing investment portfolios for individual customers wherein said portfolios include investments in one or more novel index based futures contracts.

It is yet another object of the present invention to provide a non-traditional futures contract that provides a future price for an asset and is otherwise unencumbered by a dividend pricing component and, with respect to non-institutional customers, an interest pricing component.

It is yet another object of the present invention to provide a non-traditional futures contract that provides a future price for an asset and is otherwise unencumbered by a daily margin component for long non-institutional customers.

It is yet another object of the present invention to provide for a daily margin component for short non-institutional customers which is similar in nature to the margin features of a short stock position.

The above and other objects of the present invention are realized in a non-traditional futures contract implemented on a computer data processing system for the benefit of participating customers. This novel investment vehicle incorporates a modified futures contract on a pre-select index that reflects the market cash price of a basket of equity securities, fixed income securities, currencies, and/or other financial instruments. The index is calculated from market trade data and reported to the public on a periodic or event basis (e.g., intraday). The contract, as tracked and processed by the inventive computer system, has a smaller notional value and is stripped of valuation complexities for non-institutional customers. Dividends are rolled back into the index and investing mandates a 100% performance bond for purchases by non-institutional customers. The processing system manages an interest rate pass-through feature, tracks trades, notes price movements, and performs critical accounting functions as required by the novel asset attributes.

In accordance with the varying aspects of the present invention, the novel data processing system further provides for aggregate processing of index futures contracts having a dynamically altering profile, depending on the nature of the account and/or customer. This includes select configurations for both institutional customers and non-institutional customers, based on specified criteria such as net worth. In this way the novel system permits enhanced risk management and custom tracking for regulatory purposes such as taxes, and the like.

BRIEF DESCRIPTION OF THE FIGURES

Certain aspects of the present invention are depicted in the accompanying drawings, which are intended to be considered in conjunction with the detailed description below, and which are intended to be illustrative rather than limiting, and, in which:

FIG. 1 is a functional block diagram of the environment for the present invention;

FIG. 2 is a logic flow chart for the index processor;

DETAILED DESCRIPTION OF THE INVENTION

Figure 3:
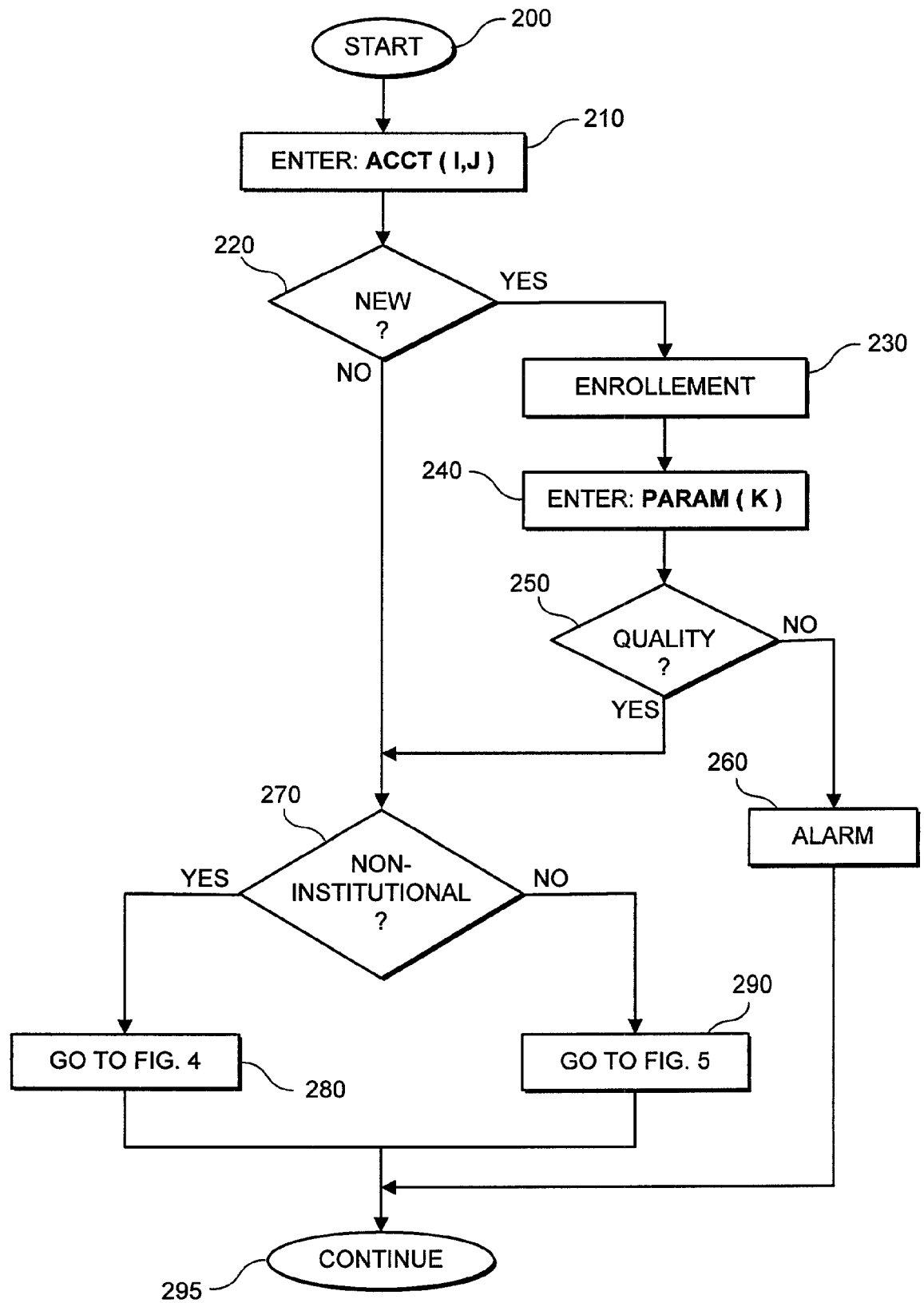
FIG. 3 is a logic flow chart for the account management algorithm.

First briefly in overview, the present invention is directed to a novel futures contract and the system for implementing the contract in the market. Accordingly, the invention includes data processing techniques and methods for creating, tracking, and managing multiple futures contracts for plural account holders in both an event and periodic triggered processing environment.

The futures contracts of the present invention are illustratively described as TRAKRS—an acronym for "Total Return Asset Contracts," reflecting the pass-through of dividend accounting during implementation.

Each TRAKRS is tied to a selectively organized index value, reflecting the cash price of a basket of financial assets (e.g., biotechnology stocks). Periodic changes in the makeup of the index result from either corporate actions or through scheduled rebalancing of the index—on some periodic basis, viz., quarterly.

TRAKRS are listed for trading on an exchange licensed to trade futures contracts, such as the Chicago Mercantile Exchange. The exchange and its affiliates are responsible for trading and clearinghouse functions associated with TRAKRS transactions. At select intervals, the pricing of the index will be updated and disseminated to the relevant market participants—typically intraday. In its preferred embodiment, TRAKRS will have a value of $1.00 multiplied by the value of the index, which will be set to equal 110 or less on the trading day prior to the first day of trading of the contract, effectively creating an initial price per contract of $110 or less. The underlying index upon which each TRAKRS is based is calculated on a total return basis (i.e., including dividends). While the foregoing are the preferred character set, variations are possible without departing from the invention.

In operation, the system employs much of the same transaction support associated with current futures contract transactions. Brokerage services are provided by a futures commission merchant ("FCM") with trades implemented by persons properly licensed by the applicable regulatory authorities.

TRAKRS, however, have a dynamic margin character, wherein the margin amount required by a purchaser depends on the account holder's parameters. In the preferred embodiment, these parameters are tied to whether the account holder qualified as a "qualified institutional buyer," as defined in Rule 144A under the Securities Act of 1933 ("QIB"). For example, if the purchaser is a corporation that in the aggregate owns and invests on a discretionary basis at least $100 million in securities of issuers that are not affiliated with the purchaser, the system considers the purchaser to be an institutional customer and applies traditional performance bond requirements—5%-10% of the purchase price. If the purchaser does not qualify as a QIB, the purchaser is considered to be a non-institutional customer, and the margin requirement is 100% of the purchase price on the long side and 50% of the purchase price on the short side.

The foregoing are preferred; other delineations may be applied, and the treatment of the purchaser adjusted accordingly.

The institutional customer, having posted a smaller initial margin amount, is subject to daily variation margin account requirements, as the index value changes through market changes to the underlying shares of the index. The non-institutional customer, however, is free from this daily margin requirement on the long side.

Each trading day after the determination of a daily settlement price, the clearing member for a customer holding a long position is required to pay the exchange's clearing corporation, and the clearing corporation in turn is required to pay the clearing member for a customer holding a short position a daily market rate of interest (e.g., the Federal Funds Effective Rate less 1.00%) on an amount equal to the Contract Size determined at such current settlement price.

To the extent the long clearing member's customer is a non-institutional customer, the clearing member will be responsible for paying the interest payment (presumably from the float from the client's margin account). To the extent the daily settlement price increases, the clearing member will meet increased interest rate pass-through obligations on behalf of a long non-institutional customer (presumably from the float on the excess margin paid by the clearing corporation to the long clearing member).

With the foregoing overview in mind, attention is directed first to FIG. 1 which depicts a functional block diagram of the salient participants to the present invention. As reflected therein, each futures contract includes a long and a short side—long defined as a future purchaser to the commodity, and short defined as the future seller. For each side of the contract, the system recognizes different purchasing entities; here the investor class is bifurcated into institutional customers and non-institutional customers; for the long side, clients 85 and 80, respectively.

Customers interact and hold investment accounts with brokers and each broker has a clearing member for implementing futures transaction on a designated exchange. In FIG. 1, the long and short clearing members are blocks 60 and 70, respectively, and these clearing members are linked to the exchange on which TRAKRS are traded, per CFTC trading protocols.

As is typical today, members employ computer processing systems for tracking and managing the various accounts implicated by the contracts. Communication links are established to permit exchange of information regarding market pricing, trade status, positions, and margin balances. Funds are transferred, either by wire (the preferred method) or via end of day delivery.

The connecting arrows in FIG. 1 reflect the exchange of assets, margins, and interest payments between the parties. In accordance with this flow, non-institutional customers must deposit a cash performance bond equal to 100% of the current TRAKRS market value to establish long TRAKRS positions and a cash performance bond equal to 50% of the current TRAKRS market value to establish short TRAKRS positions.

Non-institutional customers that purchase TRAKRS will not have any settlement variation obligations and will not receive any settlement variation payments with respect to their TRAKRS positions.

Under specified circumstances, non-institutional customers, block 90, that sell TRAKRS will make and receive maintenance payments to and from the short clearing member, block 70. If the settlement price increases to a level such that a non-institutional customer's performance bond is less than or equal to 30% of such price, the non-institutional customer must make a maintenance restoration payment to restore the performance bond to 50% of the settlement price. Alternatively, if the settlement price decreases to a level such that the performance bond is equal to or greater than 70% of the settlement price, the non-institutional customer will receive a maintenance restoration payment to restore the performance bond to 50% of the settlement price. Non-institutional customers can hold their long contracts or sell them, closing out their respective positions.

Institutional customers, blocks 85 and 95, must comply with the performance bond and settlement variation requirements set by their brokers and the exchange for long and short TRAKRS positions. Holding these positions requires the system to track the market price of the TRAKRS and confirm the settlement variation payments between each institutional customer and the related long or short clearing member, as applicable. In addition to daily pricing of its position, the institutional customer—purchasing long on margin, block 85,—must also pay a daily market rate of interest on the position to the long clearing member, block 60. This interest payment is passed through to the short institutional customers.

TRAKRS are traded on the selected exchange, and the position of all traders rationalized by the exchange's clearing house, block 50, via interchange with the various clearing members acting on behalf of customers. At the end of the contract term, TRAKRS are extinguished and the difference between the contract price and the index price is exchanged between the parties.

The operation of the system is implemented with a select index supporting TRAKRS. The index is a numerical value that corresponds with and is proportional to a basket of equity securities, fixed income securities, currencies, and/or other financial instruments. The index value requires strict adherence to industry standard computational processes to insure trust in the contracted value. Accordingly, the index is calculated at select intervals during the trading day, with the results widely reported, so that traders can accurately gauge their positions via the TRAKRS' market.

Index processing is presented in FIG. 2 in logic flow chart form. While presented as sequential processing, this is for ease of understanding; other processing regimens can be substituted (e.g., parallel) as the need may arise.

Logic begins conceptually at start block 100, and the current value of the index is entered, block 110:

$$IDX(I,J)$$

Where "I" is the Index counter and "J" is the period counter (e.g., 5 minutes). At block 120, the system culls the current period market pricing for the components that make up the Ith index. And, at test 130, the system determines if any intervening system defined events have transpired such as issuance of dividends and/or share splits. For a total return index, such as TRAKRS, the dividend yield is translated to an equivalent amount of index shares, which is then included in the index value, as calculated at block 140. In the case of dividends, effective at 3:00 p.m. (Central Standard Time) on the trading day prior to the day an index component stock will go ex-dividend, the last price of such stock will be adjusted downwards by a value equal to the dividend that will be paid on such stock.

The system next tests for corporate mergers or other corporate actions, test 150. If so, these too are used to recalculate the index and then distribute the new index value to the marketplace, block 170. The number of stocks in the index may change between quarterly index reconstitutions and rebalancings as a result of mergers, spinoffs, or other corporate actions that may dictate the removal of a stock from the index. In the event of a corporate action, test 150, or in the event of dividends, test 130, the value of the index divisor will be adjusted such that the index value subsequent to the ex-dividend adjustment or corporate action will equal the index value prior to the adjustment.

Turning now to FIG. 3, the logic flow for the initial account processing system is depicted. Logic begins conceptually at block 200 and the selected account entered at block 210. Test 220 determines if the account is new; if so, logic branches to the enrollment process, blocks 230-240, followed by qualification, test 250. A negative response to test 250 trips the alarm, block 260, and bypasses further processing of this account.

At test 270, the account is then filtered on a system selected basis. For this implementation, the system checks whether the account is a non-institutional customer.

Figure 4:
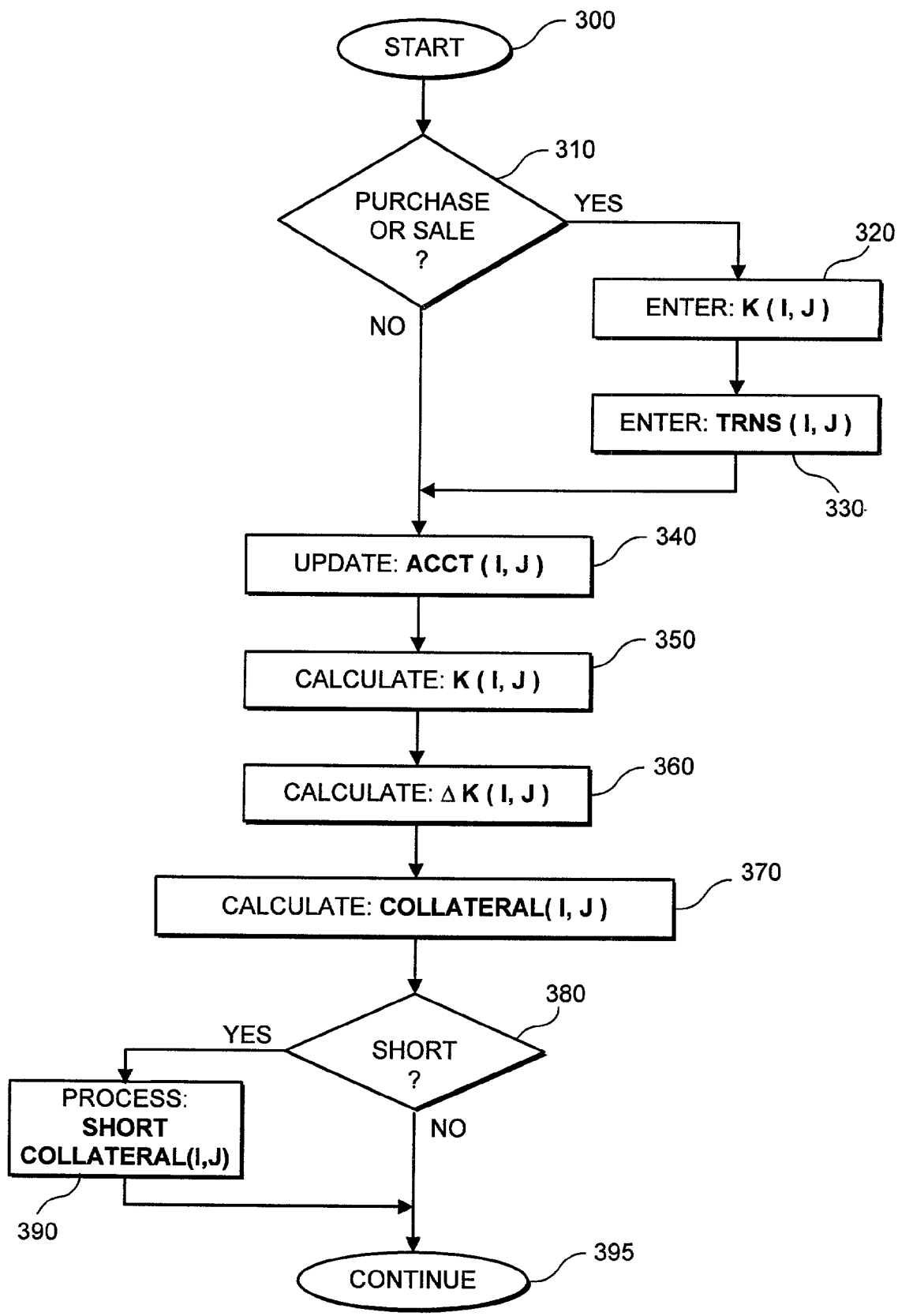
FIG. 4 is a logic flow chart for non-institutional customer account processing.

A positive response to test 270 branches logic to the routines described in FIG. 4. A negative response indicates an institutional customer, and this branches logic to FIG. 5, block 290, and the associated logic depicted therein. At block 295, the system continues processing for the next account, via incremental counter.

Processing of non-institutional customer accounts is depicted at FIG. 4, beginning with test 310 and the inquiry regarding further purchase or sale of TRAKRS. A positive response shifts logic to blocks 320-330, and the system implements the transaction specified by the instructions of the customer. At block 340, the customer's account is updated for the new pricing in the marketplace for any open positions in TRAKRS. In particular, the system prices each contract, K(I, J) for the current period, block 350. At block 360, the system recalls the earlier contract price and calculates the differential from this prior period, ΔK(I,J), and then calculates the current collateral adjustment required by or due to the long customer for that period, block 370. If the position is "short", test 380 branches logic to block 390, and the system processes the collateral required by or due to the short customer. Processing continues for each TRAKRS in the account, block 395.

Figure 5:
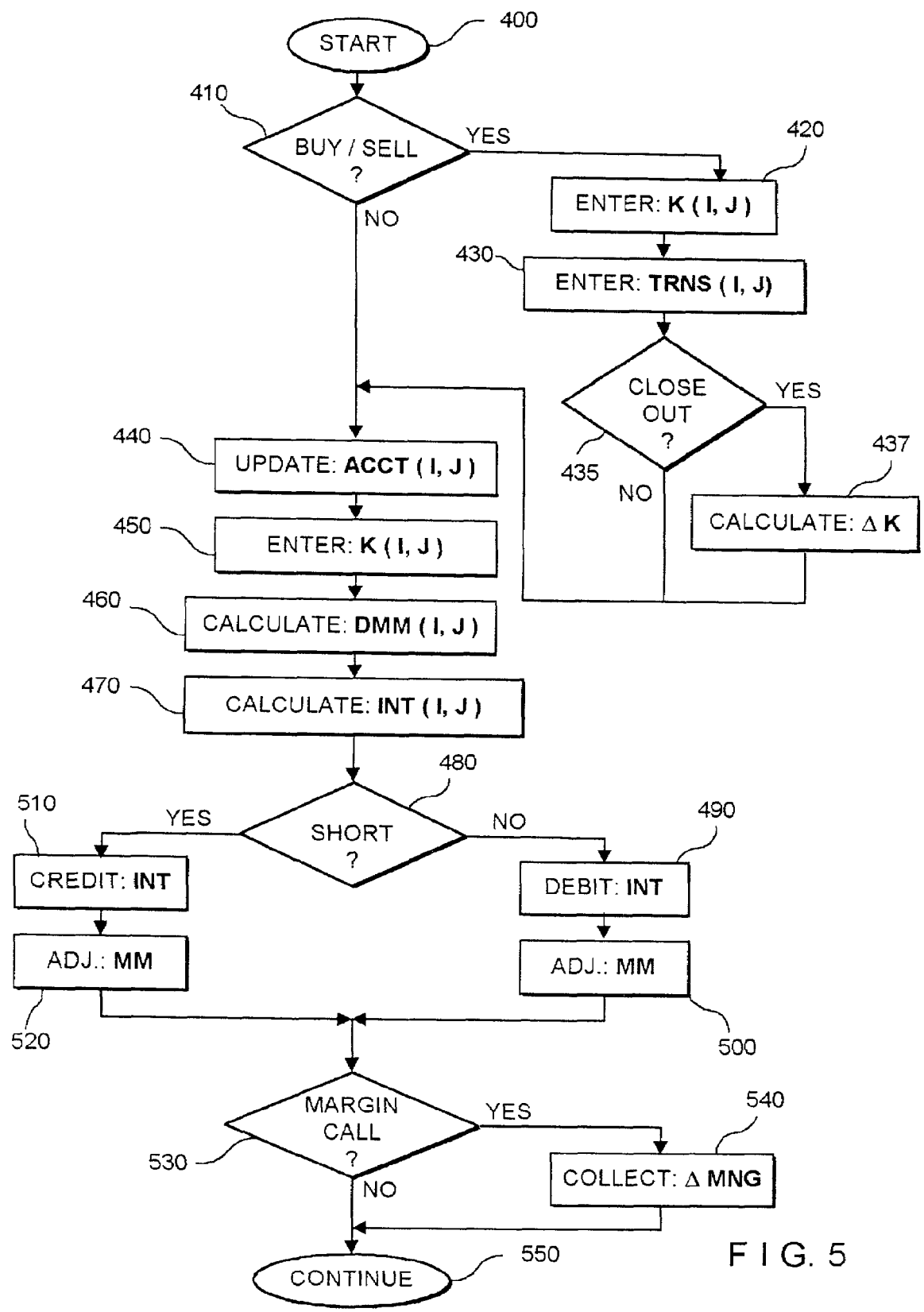
FIG. 5 is a logic flow chart for institutional customer account processing.

The processing of institutional customer accounts has several distinctions, as shown in FIG. 5. Beginning at block 400, the system first tests for new transactions, test 410, and these are implemented at blocks 420-430. Test 435 determines if the transaction is a close out of a contract; if so, logic branches to block 437 and the change in contract value is determined. These results are then used to update the account file, block 440. At test 450, the system enters the contract, K(I,J) for each TRAKRS in the account. The system then calculates the change in value of the contract to the client (i.e., "marked to market") and stores it in variable ΔMM(I,J), block 460. In addition, the system calculates the interval interest amount applying the market interest rate to current market value of the contract, K(I,J), block 470.

Continuing with FIG. 5, test 480 determines if the institutional customer's position for the K(I,J) is short. If so, logic branches to block 510 wherein INT(I,J) for the contract is credited to the account, and the position is adjusted by the incremental change in the market value of the contract, block 520. If the position is long, however, logic proceeds to block 490 for an INT debit, followed by the price adjustment at block 500.

In either event, logic proceeds to margin, test 530, and if the current value of the collateral in the account is below the threshold, a margin call is made, block 540. Processing then continues to the next contract, block 550.

EXAMPLE 1

The above system characteristics are illustrated in the following example directed to a futures contract accounting system for an index in a select business sector, here the biotechnology sector. The specific holdings for this example are delineated in Table I below:

TABLE I

| Ticker | Company Name | Initial Weighting |
|--------|--------------|-------------------|
| AMGN | Amgen Inc. | 10.00% |
| DNA | Genentech Inc. | 10.00% |
| IMNX | Immunex Corp | 10.00% |
| MEDI | Medimmune Inc | 9.18% |
| BGEN | Biogen Inc | 5.86% |
| MLNM | Millennium Pharmactcls Inc | 6.04% |
| CHIR | Chiron Corp | 4.97% |
| HGSI | Human Genome Sciences Inc | 4.55% |
| GENZ | Genzyme General | 3.49% |
| IDPH | Idec Pharmaceuticals Corp | 3.50% |
| CRA | Pe Corp Celera Gen Grp | 2.91% |
| ABGX | Abgenix Inc | 2.80% |
| CELG | Celgene Corp | 2.31% |
| GILD | Gilead Sciences Inc | 2.30% |
| AFFX | Affymetrix Inc | 2.14% |
| VRTX | Vertex Pharmaceuticals Inc | 1.92% |
| MEDX | Medarex Inc | 1.91% |
| PDLI | Protein Design Labs Inc | 1.80% |
| IMCL | Imclone Systems Inc | 1.55% |
| ICOS | Icos Corporation | 1.46% |
| CORR | Cor Therapeutics Inc | 1.46% |
| INCY | Incyte Genomics Inc | 1.41% |
| ENZN | Enzon Inc | 1.27% |
| ALKS | Alkermes Inc | 1.04% |
| TNOX | Tanox Inc | 1.09% |
| EXEL | Exelixis Inc | 1.04% |
| MAXY | Maxygen Inc | 1.12% |
| MYGN | Myriad Genetics Inc | 0.96% |
| ABSC | Aurora Biosciences Corp | 1.03% |
| ACLA | Aclara Biosciences Inc | 0.91% |

Each TRAKRS index is calculated by an Index Calculation Agent at select intervals during the trading day and will move upwards or downwards in response to the market movements of the underlying index components. In addition, as the index reflects a total return, dividend payments are incorporated into the index value. Other events that alter the index value include mergers, acquisitions, special distributors, and the like on a company basis. Finally, an Index Compilation Agent has preset limits regarding diversity and the like, and the index may be adjusted to reflect these changes on a periodic basis.

In operation, the system supports transactions for two classes of customers—institutional and non-institutional. Institutional customers are large entities, typically pension funds, hedge funds, or insurance companies. Non-institutional customers are smaller entities and individuals involved in retail investment products.

TRAKRS may be offered to both customer classes through a futures commission merchant. TRAKRS also may be offered to non-institutional customers through a broker-dealer. In either case, TRAKRS funds are held in segregated accounts maintained by clearing members.

For an institutional customer, a long position and a short position in TRAKRS each requires a performance bond of 5%-10% of the total contract price. In addition, the institutional customer's account is subject to daily settlement variation requirements for each TRAKRS position.

Each trading day after the determination of the daily settlement price, the institutional customer holding a long TRAKRS position pays its long clearing member (based on the amount of long TRAKRS held by the institutional customer multiplied by the applicable TRAKRS values), and the institutional customer holding a short TRAKRS position will receive from its short clearing member (based on the amount of short TRAKRS held by the institutional customer multiplied by the applicable TRAKRS values), a daily market rate of interest. For this example, the daily rate of interest may equal the Federal Funds Effective Rate less 1.00%. Interest payment are tracked and disbursed on a daily basis.

For a non-institutional customer, a long position in TRAKRS requires a performance bond equal to 100% of the total contract price, and a short position in TRAKRS requires a performance bond equal to 50% of the total contract price. A non-institutional customer that holds a long TRAKRS position will not have any settlement variation obligations and will not receive any settlement variation payments with respect to that position. However, a non-institutional customer that holds a short TRAKRS position will make and receive maintenance payments under specified circumstances. If the settlement price increases to a level such that the non-institutional customer's performance bond is less than or equal to 30% of such price, the non-institutional customer will make a maintenance restoration payment to restore the performance bond to 50% of the settlement price. Alternatively, if the settlement price decreases to a level such that the performance bond is equal to or greater than 70% of the settlement price, the non-institutional customer will receive a maintenance restoration payment to restore the performance bond to 50% of the settlement price.

The long and short positions for TRAKRS are decoupled, and are traded in the marketplace, pending expiration of the contract. Because time value associated with the contract term is offset by the value of the interest rate pass-through, the pricing will reflect the underlying index value. Unless closed out earlier, both sides of the contract will close at the term of the contract, with payment based on the difference between the contract price and market price for the index.

The Index Compilation Agent (typically, the brokerage) identifies a universe of common stocks and American depositary shares primarily listed for trading on a U.S. securities exchange or through the Nasdaq National Market System. For this example, stocks are selected that represent all of the companies involved in the biotechnology industry (the "Biotechnology Stocks") and then excludes companies that do not have: (1) a minimum market capitalization of $150 million; (2) a minimum 60-day average daily trading volume of $1 million; or (3) a minimum 60-day average daily share volume of 100,000 shares per day.

The Index Compilation Agent then rank orders the Biotechnology Stocks that meet or exceed its eligibility criteria by, for example, market capitalization, selecting the top 30 issues (the "Component Stocks").

Once the Component Stocks have been selected for inclusion in the index, the Index Compilation Agent will apply a weighting algorithm to them. For example, a modified capitalization weighting algorithm could be applied so that if any stock should carry more than a 10% weight, its excess weight shall be proportionately redistributed among the remaining Component Stocks. For example, if the stock with the largest weighting carries a weight of more than 10% in the index, its excess weight will be proportionately redistributed among the remaining 29 Component Stocks. Similarly, if the stock with the second highest weighting carries a weight of more than 10% in the index, its excess weight will be proportionately redistributed among the remaining 28 Component Stocks. The Index Compilation Agent will continue this process until no stock has more than a 10% weight in the index. The Calculation Agent will calculate and disseminate index quotes every fifteen seconds during the course of each trading day. The index will be calculated on a total return basis (i.e., the value will reflect price fluctuations plus dividends declared on the Component Stocks). The Calculation Agent will make this calculation by (1) multiplying the last sale price of each Component Stock on its primary exchange by the number of shares of such Component Stock represented in the index, (2) summating these products across all Component Stocks, and (3) dividing the sum by the current divisor.

The Index Compilation Agent will set the initial value of the divisor. On the trading day prior to the first day of trading of TRAKRS based upon a specific TRAKRS index, the Index Compilation Agent will be published as promptly as practicable. All changes to the index will become effective at 4:00 PM EST on the third Friday of March, June, September, and December (or if such Friday is not a business day, the first business day prior thereto).

The number of Component Stocks in the index shall remain fixed between quarterly rebalancings except in the event of certain types of corporate actions such as a merger or other corporate reconstitution event that warrants the removal of a Component Stock prior to the Quarterly Rebalancing. In such case, the index divisor shall be recalculated to ensure the continuity of the index's value.

For instance, an underlying Index may be based on debt securities, preferred securities, or non-U.S. securities; the interest rate pass-through may partially or completely offset time value; and the term of the contract may be short, medium, or long term.

Although the invention has been described in detail for the purpose of illustration, it is to be understood that such detail is solely for that purpose and that variations can be made therein by those skilled in the art without departing from the spirit and scope of the invention.

What is claimed is:

1. A data processing system for implementing an investment vehicle, wherein said vehicle is in the form of a futures contract tied to an index value on a basket of securities, said system comprising:
    a futures contract processor having access to stored data relating to said futures contract, said processor calculating an amount of interest to pass-through for said contract for delivery to a short side;
    a memory storage comprising said information of said futures contracts and in communication with said processor; and
    a customer filter for determining a class of customer, and based thereon applying a set of processing rules for futures contract processing to the specified customer.

2. The data processing system of claim 1 wherein said futures contract processor resides in part or in whole on one or more computers located with a clearing member, account broker, and/or a trade association.

3. The data processing system of claim 1 further comprising an account data management system for tracking and managing data associated with trades and prices of said vehicle and updating account files for customers participating in said trades.

4. The data processing system of claim 3 wherein said account data management system includes memory storage for historical account data, wherein said account data includes demographic information on said customers and current account balances for accounts held by said customers and associated with said vehicle trading.

5. The data processing system of claim 4 wherein said customer filter selectively segregates customers by valuing the assets under control by said customer and assigning customer participation in margin requirements through a stored threshold.

6. The data processing system of claim 5 wherein said client filter compares said threshold to a client asset value and treats clients meeting said threshold as institutional investors for margin purposes.

7. The data processing system of claim 6 wherein said institutional customers are subject to periodic settlement variation requirements.

8. The data processing system of claim 5 wherein said customers having assets less than the threshold are free from periodic settlement variation requirements for long positions but are subject to modified settlement variation requirements for short positions.

9. A data processing system for the tracking and management of account information associated with non-traditional futures contracts, said system comprising:
    an account information input module for collecting and organizing account data associated with customers and investments, wherein said account information includes account status details sufficient to ascertain a select asset threshold for determining a level of margin for said account holder;
    an account transaction processor for receiving orders and trading information and selectively updating account information in response to said order and trading information; and
    account transaction data storage providing dynamic retention of current account data associated with said accounts and limited historical account data tracing recent activity within each of said accounts;
    wherein transaction data storage includes demographic data for each of said account holders, including information regarding a valuation of account holder assets;
    wherein said account transaction processor includes communication links to one or more futures exchanges for executing orders and/or updating account data; and
    wherein said account transaction processor includes interest pass-through between long and short clearing members and the interest pass-through between institutional customers and the long and short clearing members.

10. The system of claim 9 wherein said interest rate pass-through is in the direction from a long side to a short side of said select investment vehicle.

11. A method for implementing trading of a derivative futures contract, said method comprising the steps of:
    a. collecting client data and a request for establishing a long contract position;
    b. creating an account and funding said account with 100% of a contract price for a long position;
    c. holding a contract corresponding to a select portfolio of underlying assets; d. pricing said contract on a total return basis; and e. passing interest rate payments from the long side of said contract to the short side.

12. The method of claim 11 further comprising the step of establishing a short contract position.

13. The method of claim 11 further comprising the step of providing a margin of 5%-10% for customers meeting a threshold asset requirement.

14. The method of claim 13 wherein margin requirements apply to both long and short positions of said contract.

15. A data processing system for managing transactions associated with a non-traditional futures contract, said system comprising:
    a brokerage processor for maintaining customer records and entering trading commands for customers having accounts therewith;
    a long clearing member processor for processing orders for said contract on behalf of said brokerage customers;
    a short clearing member processor for processing orders for said contract on behalf of said brokerage customers; and
    a clearing exchange processor for executing trading commands establishing long and short positions of said contract and for monitoring and processing the interest rate pass-through from long clearing members to short clearing members,
    said system provides for select margin requirements wherein non-institutional customers post substantially all of said contract price, and interest rate payments are periodically processed moving from the long side to the short side with respect to TRAKRS positions of institutional customers and from long clearing members to short clearing members with respect to TRAKRS positions of institutional and non-institutional customers and clearing members.

16. The system of claim 15 wherein long and short clearing members post collateral of approximately 5%-10% of the notional value of said contract.

17. The system of claim 15 wherein said institutional customers post collateral of 5%-10% of the notional value of said contract with said long and short clearing members.

18. The system of claim 15 wherein said retail investors are not subject to daily margin requirements on the long side.

19. The system of claim 18 wherein the retail investor is subject to a 50% margin requirement on the short side.

20. The system of claim 15 further comprising account processing for determining periodic mark to market price changes for said contract.

* * * * *